United States Patent
Nishizawa

(10) Patent No.: US 9,832,360 B2
(45) Date of Patent: Nov. 28, 2017

(54) IMAGE CAPTURING APPARATUS AND METHOD OF CONTROLLING THE SAME

(71) Applicant: CANON KABUSHIKI KAISHA, Tokyo (JP)

(72) Inventor: Hideta Nishizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 14/820,162

(22) Filed: Aug. 6, 2015

(65) Prior Publication Data

US 2016/0044231 A1   Feb. 11, 2016

(30) Foreign Application Priority Data

Aug. 11, 2014   (JP) ................. 2014-163942

(51) Int. Cl.
| | |
|---|---|
| *H04N 5/225* | (2006.01) |
| *H04N 5/232* | (2006.01) |
| *H04N 5/369* | (2011.01) |
| *H04N 5/3745* | (2011.01) |

(52) U.S. Cl.
CPC ..... *H04N 5/23212* (2013.01); *H04N 5/23245* (2013.01); *H04N 5/3696* (2013.01); *H04N 5/3745* (2013.01)

(58) Field of Classification Search
CPC .................. H04N 5/3696; H04N 5/23212
See application file for complete search history.

(56) References Cited

U.S. PATENT DOCUMENTS

| | | | | |
|---|---|---|---|---|
| 6,933,978 | B1* | 8/2005 | Suda .................. | G02B 7/34 348/345 |
| 2001/0036361 | A1* | 11/2001 | Suda .................. | G03B 13/32 396/111 |
| 2004/0150733 | A1* | 8/2004 | Nagayoshi .......... | H04N 3/1562 348/272 |
| 2005/0104982 | A1* | 5/2005 | Shimazu .............. | H04N 9/045 348/294 |
| 2008/0317454 | A1* | 12/2008 | Onuki ................. | G02B 7/08 396/128 |
| 2010/0302433 | A1* | 12/2010 | Egawa ................ | G02B 7/34 348/345 |
| 2011/0085052 | A1* | 4/2011 | Honda ................ | H04N 9/045 348/223.1 |

(Continued)

FOREIGN PATENT DOCUMENTS

| | | |
|---|---|---|
| JP | 2001-124984 A | 5/2001 |
| JP | 2013-178564 A | 9/2013 |

*Primary Examiner* — Twyler Haskins
*Assistant Examiner* — Dwight C Tejano
(74) *Attorney, Agent, or Firm* — Cowan, Liebowitz & Latman, P.C.

(57) ABSTRACT

An image capturing apparatus comprises an image sensor that includes a pixel array in which a plurality of unit pixels, each having a plurality of photoelectric conversion elements, are arranged in matrix, and a plurality of column output lines respectively provided in columns of the pixel array, and a control unit that performs control such that in a case in which signals from a portion of photoelectric conversion elements of each of the plurality of unit pixels is to be read out, signals from a plurality of unit pixels that are arranged in the same column of the pixel array are output simultaneously to one column output line out of the plurality of column output lines.

6 Claims, 10 Drawing Sheets

(56) References Cited

U.S. PATENT DOCUMENTS

| | | | | |
|---|---|---|---|---|
| 2011/0096189 A1* | 4/2011 | Taniguchi | ............... | G02B 7/34 |
| | | | | 348/222.1 |
| 2011/0199506 A1* | 8/2011 | Takamiya | ............... | G02B 7/34 |
| | | | | 348/222.1 |
| 2013/0076972 A1* | 3/2013 | Okita | ............... | H04N 5/23212 |
| | | | | 348/360 |
| 2013/0201383 A1* | 8/2013 | Okado | ............... | G02B 7/34 |
| | | | | 348/345 |
| 2014/0192248 A1* | 7/2014 | Kishi | ............... | H04N 5/23212 |
| | | | | 348/345 |
| 2014/0204241 A1* | 7/2014 | Ohara | ............... | H04N 5/243 |
| | | | | 348/223.1 |
| 2014/0307134 A1* | 10/2014 | Kanda | ............... | H04N 5/23212 |
| | | | | 348/280 |

* cited by examiner

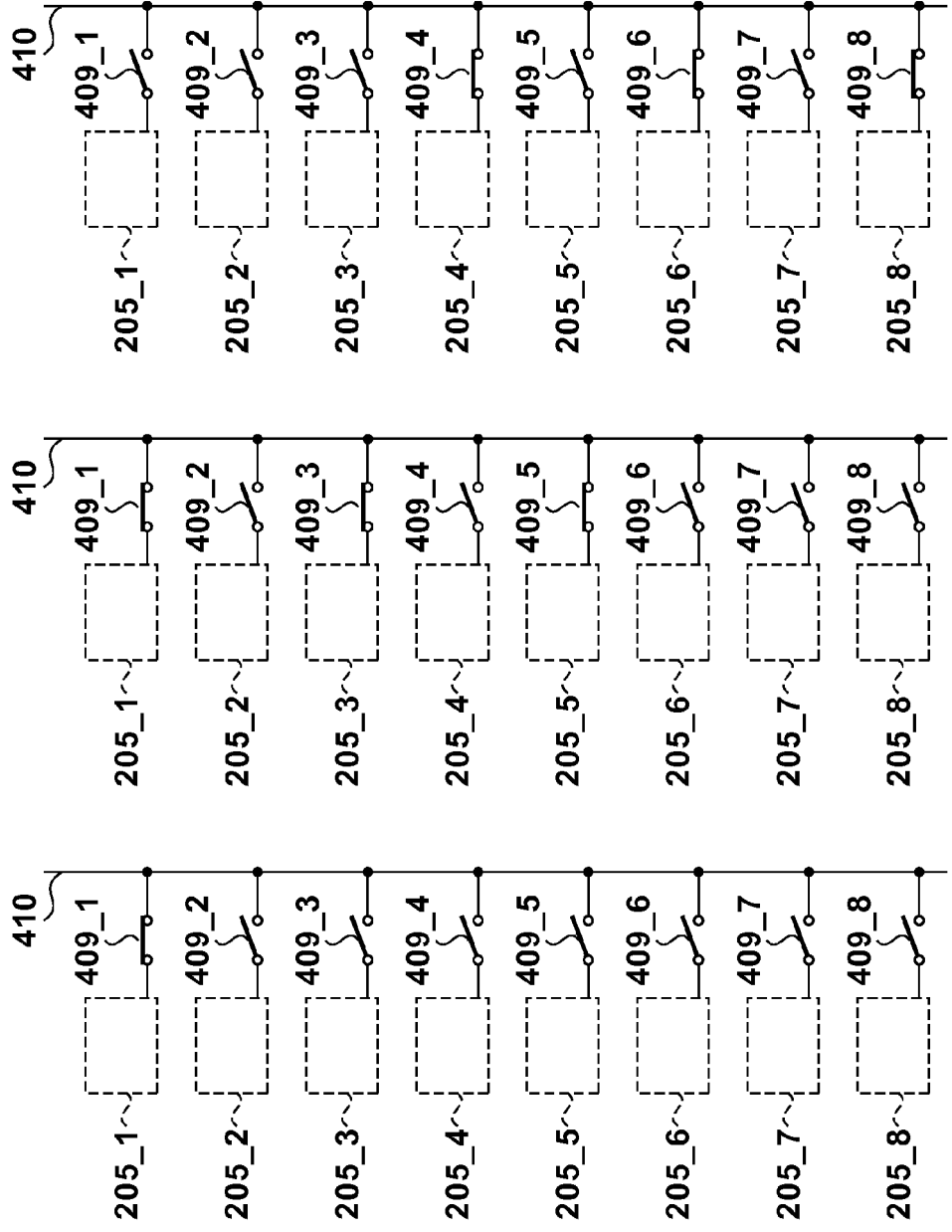

F I G. 6A      F I G. 6B
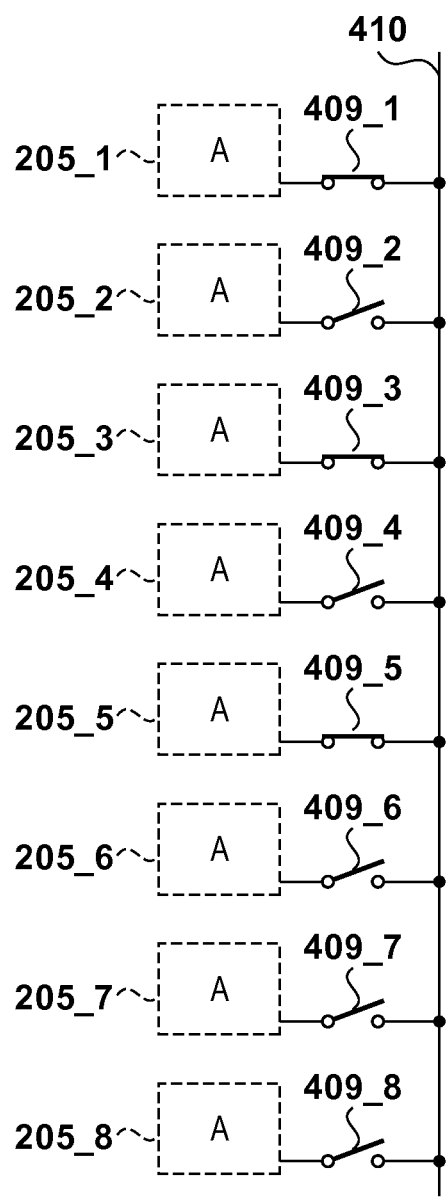
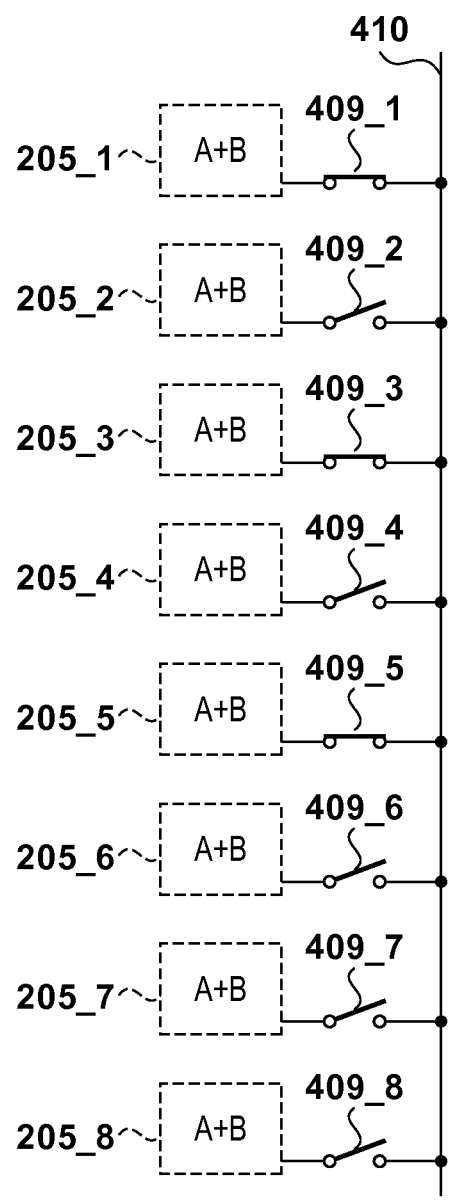

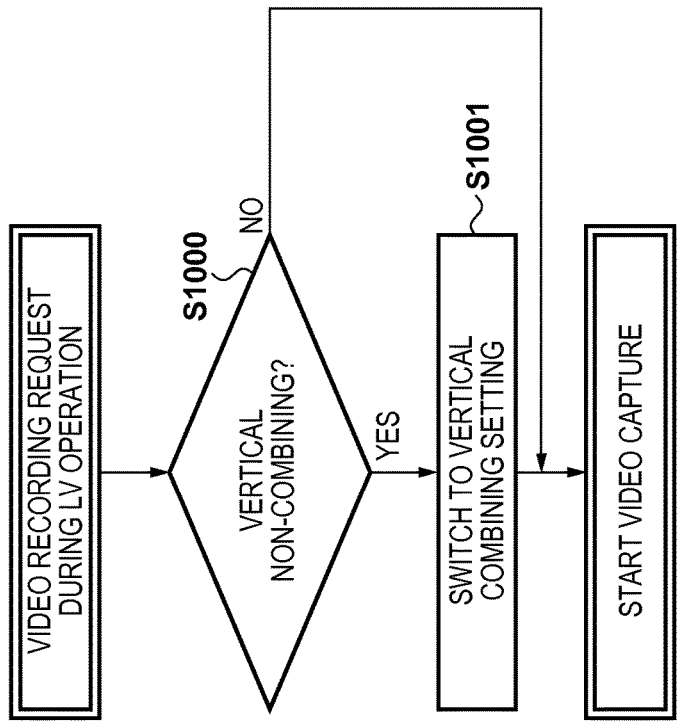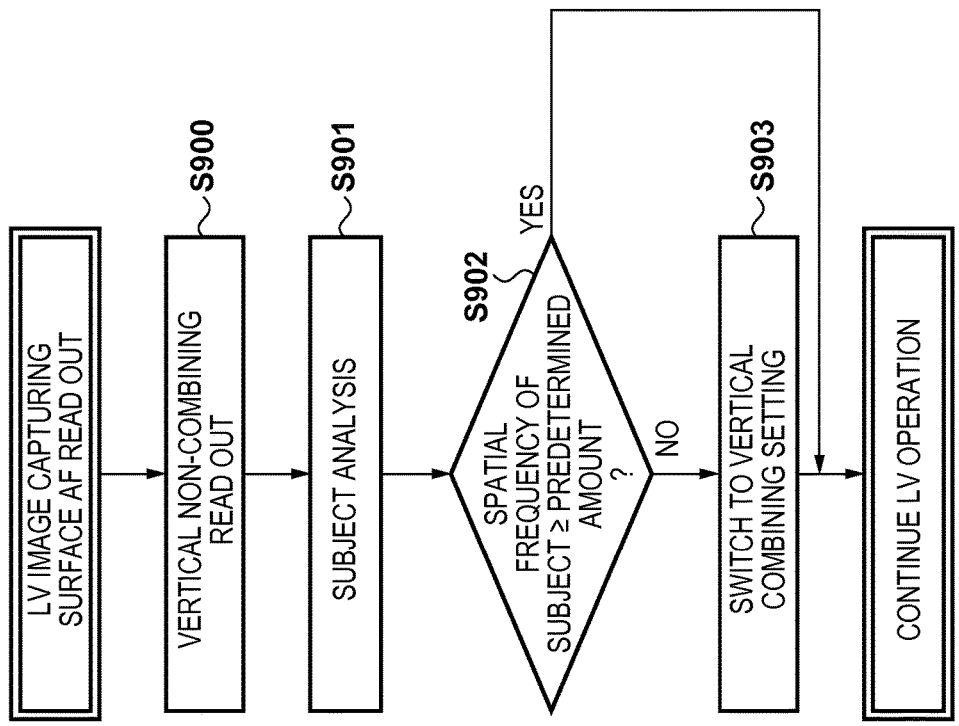

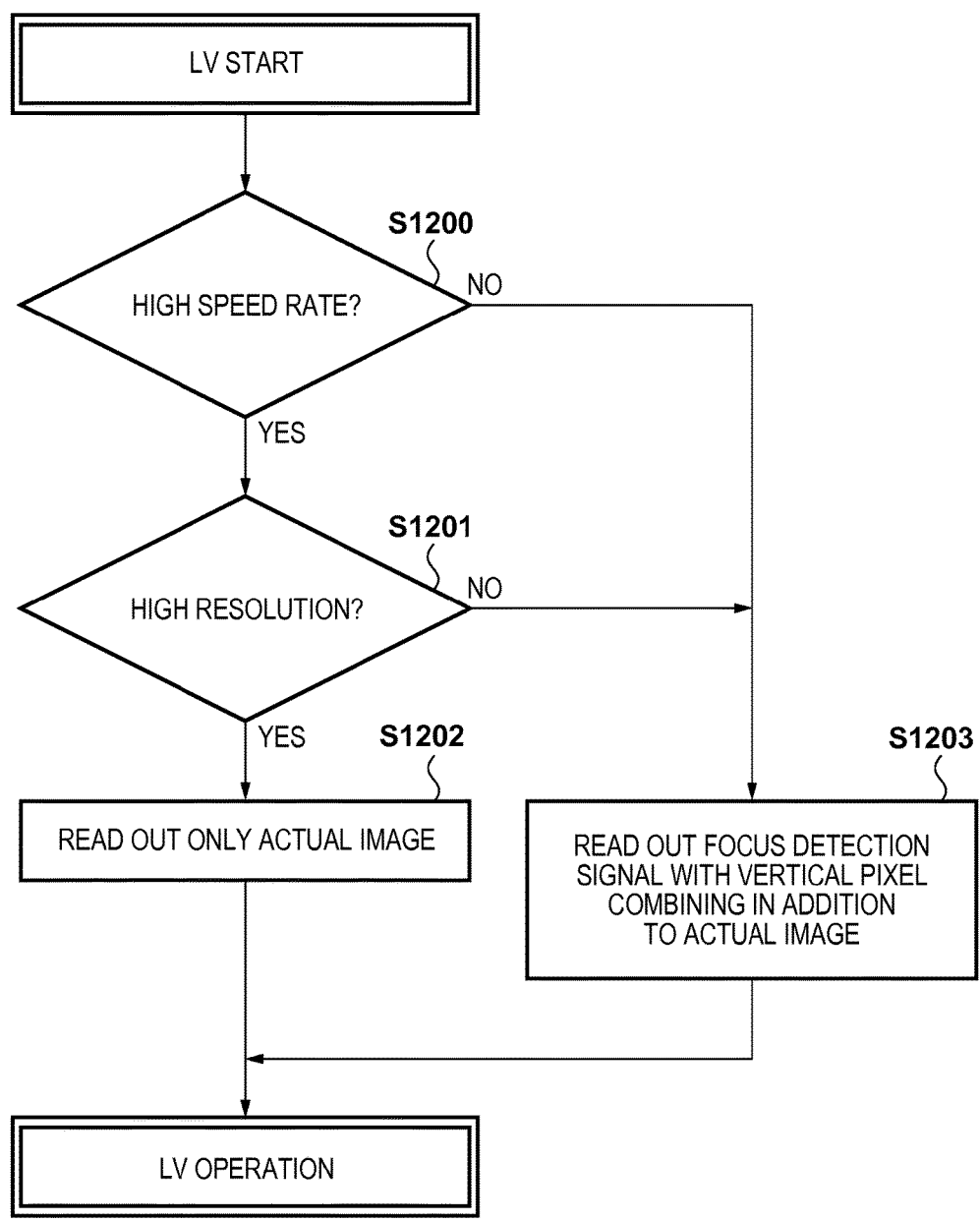

IMAGE CAPTURING APPARATUS AND METHOD OF CONTROLLING THE SAME

BACKGROUND OF THE INVENTION

Field of the Invention

The present invention relates to an image capturing apparatus.

Description of the Related Art

In recent years, an image sensor with a structure capable of performing pupil-division type focus detection has been employed in digital cameras and digital video cameras. For example, in Japanese Patent Laid-Open No. 2001-124984, two photodiodes are provided in one pixel of an image sensor, and the two photodiodes are each configured so as to use one microlens to receive light that has passed through a different pupil area of the image capturing lens. Accordingly, phase difference detection type focus detection can be formed by comparing the output signals from the two photodiodes. Also, a captured image signal can be obtained by adding the output signals from the two photodiodes.

In Japanese Patent Laid-Open No. 2013-178564, a technique is described in which in the case where phase difference detection is performed with the image capture surface, the signals from G pixels are read out after performing horizontal adding, and the signals from the R and B pixels are read out without performing horizontal adding.

In a system of reading out output signals from two photodiodes such as those described above, there are cases where the subject is dark, there is a lot of noise, and the correlation operation for focus detection cannot be performed correctly.

SUMMARY OF THE INVENTION

The present invention has been achieved in light of the above-described problems, and provides an image capturing apparatus that performs phase difference detection type automatic focus adjustment with the image capture surface, in which accurate automatic focus adjustment is possible even in cases in which the subject is dark.

According to a first aspect of the present invention, there is provided an image capturing apparatus comprising: an image sensor that includes a pixel array in which a plurality of unit pixels, each having a plurality of photoelectric conversion elements, are arranged in matrix, and a plurality of column output lines respectively provided in columns of the pixel array; and a control unit that performs control such that in a case in which signals from a portion of photoelectric conversion elements of each of the plurality of unit pixels is to be read out, signals from a plurality of unit pixels that are arranged in the same column of the pixel array are output simultaneously to one column output line out of the plurality of column output lines.

According to a second aspect of the present invention, there is provided a method of controlling an image capturing apparatus that has an image sensor that includes a pixel array in which a plurality of unit pixels, each having a plurality of photoelectric conversion elements, are arranged in matrix, and a plurality of column output lines respectively provided in columns of the pixel array, the method comprising a control step of performing control such that, in a case in which signals from a portion of photoelectric conversion elements of each of the plurality of unit pixels is to be read out, signals from a plurality of unit pixels that are arranged in the same column of the pixel array are output simultaneously to one column output line out of the plurality of column output lines.

According to a third aspect of the present invention, there is provided an image capturing apparatus comprising: an image sensor that includes a pixel array in which unit pixels, each having a plurality of photoelectric conversion elements, are arranged in matrix, and a plurality of column output lines respectively provided in columns of the pixel array; and a control unit performs control such that in a case in which signals from a portion of photoelectric conversion elements of the unit pixels are to be read out, floating fusion portions of a plurality of unit pixels that are arranged in the same column of the pixel array are connected to each other.

Further features of the present invention will become apparent from the following description of exemplary embodiments with reference to the attached drawings.

BRIEF DESCRIPTION OF THE DRAWINGS

FIGS. 5A to 5C are illustrative diagrams of vertical pixel combining according to the first embodiment of the present invention.

FIGS. 6A and 6B are illustrative diagrams of the combining of both focus detection output and image output according to the first embodiment of the present invention.

FIG. 9 is a flowchart according to the second embodiment of the present invention.

FIG. 10 is a flowchart according to a third embodiment of the present invention.

FIG. 12 is a flowchart according to the fourth embodiment of the present invention.

DESCRIPTION OF THE EMBODIMENTS

The following is a detailed description of embodiments of the present invention with reference to the accompanying drawings.

First Embodiment

Figure 1:
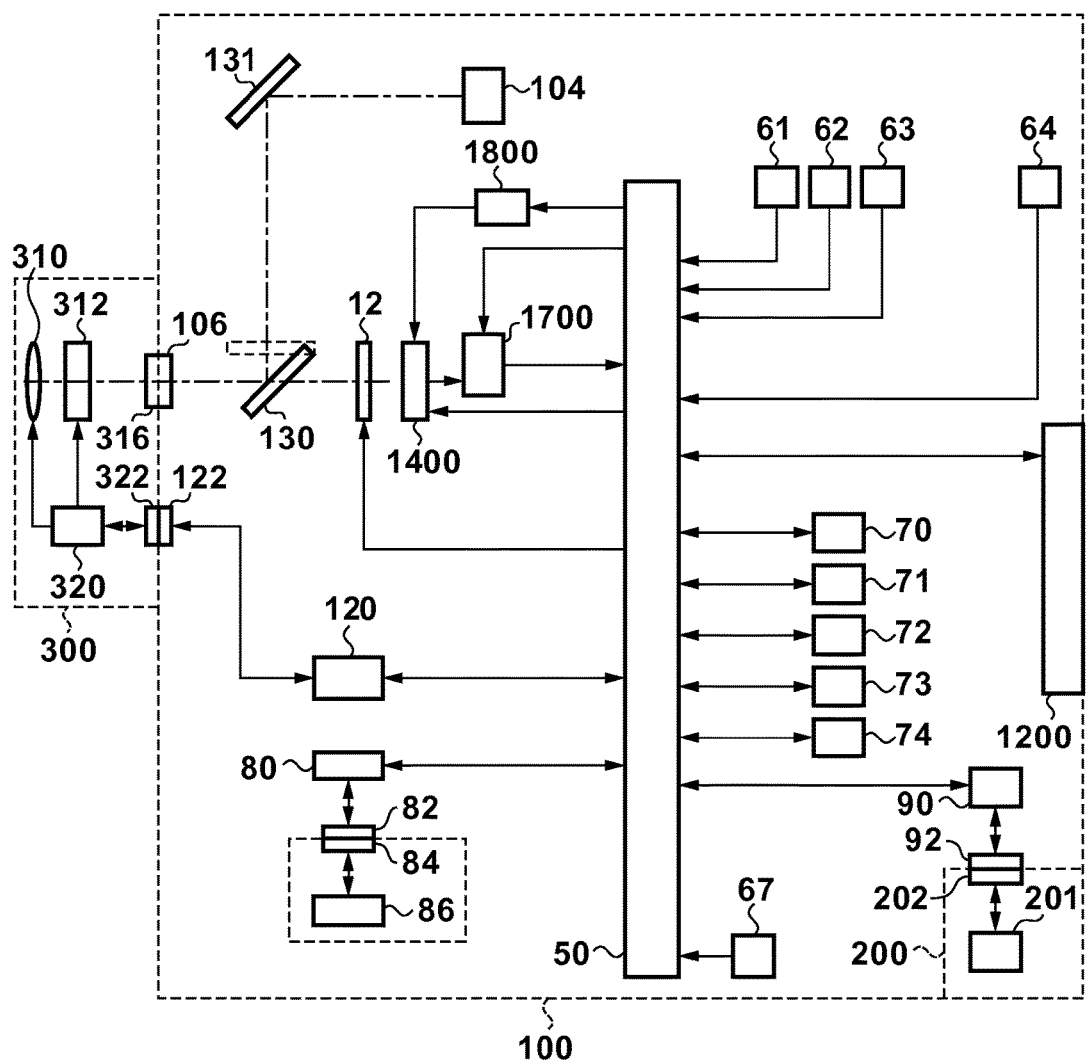
FIG. 1 is a block diagram that shows a configuration of an image capturing apparatus according to a first embodiment of the present invention.

FIG. 1 is a block diagram that shows the configuration of an image capturing apparatus system according to a first embodiment of the present invention. In FIG. 1, the image capturing apparatus system of the present embodiment is configured to include an image capturing apparatus 100, a recording medium 200 such as a memory card or a hard disk, and a lens unit 300.

Details of these blocks will be described here. First, the inner portion of the image capturing apparatus 100 will be described. A shutter 12 controls the amount of light that enters an image sensor 1400, and the image sensor 1400 converts an optical image into an electrical signal. The incident light from the lens unit 300 is reflected by mirrors 130 and 131, and is guided to an optical viewfinder 104. In the case in which the mirror 130 is on the optical path of the imaging lens, the optical viewfinder 104 focuses the incoming light, and the still image that is to be captured can be checked by a user viewing the focused image.

An analog front end (hereinafter referred to as an AFE) 1700 is internally equipped with an A/D converter that converts analog signals output from the image sensor 1400 into digital signals. A timing generator (hereinafter referred to as a TG) 1800 supplies clock signals and control signals to the image sensor 1400 and the A/D converter. An LCD monitor 1200 can display live view (LV) images and captured still images. A system control circuit (hereinafter referred to as a CPU) 50 performs overall control of the operations of the image capturing apparatus 100, including image processing.

A shutter switch 61 has two levels, a press to a shallow first level by a user is called a half-press, and a deep press to a second level is a full-press. When the CPU 50 detects a half-press of the shutter switch 61, automatic focusing is performed, and setting of the shutter speed and aperture value is performed by an automatic exposure mechanism in the state prior to shooting. With a full-press, the shutter 12 operates and a shooting operation is executed.

A start/stop switch 62 for the live view (LV) performs continuous video recording in the case where a start instruction is received from the user. In the case where the shutter switch 61 enters the half-pressed state during live view display, auto-focus (AF) is performed using a focus detection output signal from the image sensor 1400, which is described later on.

In accordance with instructions made by the user on an ISO sensitivity setting switch 63, the CPU 50 sets sensitivity with regards to the amount of light in the image capturing apparatus 100. In accordance with instructions from the user made on a power switch 64, the CPU 50 performs switches between turning the power ON and turning the power OFF for the image capturing apparatus 100. Also, power ON and power OFF settings can be switched for various attachments such as the lens unit 300, an external flash, and the recording medium 200 that are connected to the image capturing apparatus 100.

A volatile memory (hereinafter referred to as RAM) 70 temporarily records image data, and also functions as a work memory for the CPU 50. A non-volatile memory (ROM) 71 stores programs used when the CPU 50 is performing operations. An image processing portion 72 performs processing such as the correction and compression of still images. An auto-focus operation portion 73 calculates the driving amount of an imaging lens 310 which is to be described later on, from a focus detection signal for auto-focusing. A subject analysis portion 74 examines the spatial frequency of the subject.

A power source control portion 80 is configured by a battery detection circuit, a DC-DC converter, and a switch circuit that switches the blocks that receive power, for example. Furthermore, detection of the presence or absence of an attached battery, the type of battery, and the remaining battery amount is performed, and based on the detection results and the instructions from the CPU 50, the DC-DC converter is controlled, and a necessary voltage is supplied to various portions, including the recording medium, for the necessary period of time. Connectors 82 and 84 connect a power source portion 86 to the image capturing apparatus 100. The power source portion 86 is made up of a primary battery such as an alkaline battery or lithium battery, a secondary battery such as a lithium ion battery, an AC adapter, or the like.

An interface 90 is an interface with a recording medium such as a memory card or hard disk, and a connector 92 performs the connection of the recording medium 200, such as a memory card or a hard disk. The recording medium 200 has a recording portion 201 that is constituted by a semiconductor memory or a magnetic disk for example, and an interface 202 for the image capturing apparatus 100.

The lens unit 300 includes the imaging lens 310, a diaphragm 312, and a lens mount 316. The lens mount 316 is connected to a lens mount 106 on the image capturing apparatus 100 side. A lens control portion 320 performs overall control of the lens unit 300, and a connector 322 electrically connects the lens unit 300 and the image capturing apparatus 100. The lens control portion 320 receives a signal from the image capturing apparatus 100 via the connectors 322 and 122. Focus is controlled by changing the position of the imaging lens 310 on the optical axis in accordance with this signal. Likewise, the lens control portion 320 receives a signal from the image capturing apparatus 100, and controls the size of the opening of the diaphragm 312. Note that an interface 120 is an interface for communicating with the lens unit 300 using electrical signals.

Figure 2:
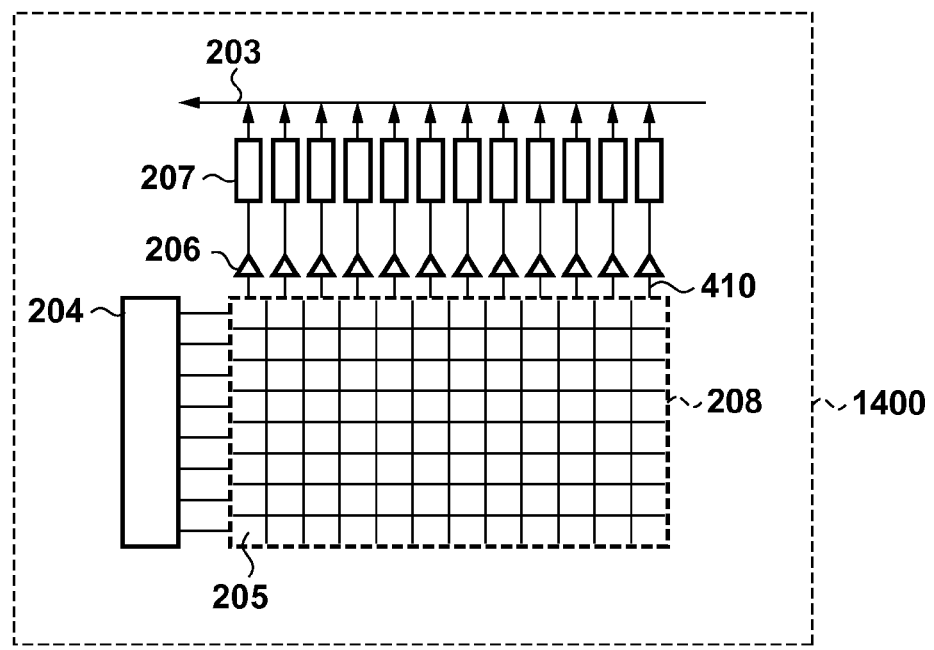
FIG. 2 is a schematic diagram of an image sensor according to the first embodiment of the present invention.

FIG. 2 is a simple diagram of the configuration of the image sensor 1400. A plurality of unit pixels 205 are arranged in a 2D matrix on an image capture surface of the image sensor 1400. A vertical line in a matrix pixel array is referred to as a "column", and a horizontal line referred to as a "row". A pixel array 208 is a collection of all of the pixels in rows and columns. A vertical scanning circuit 204 outputs, to the pixel circuits, row selection signals for reading out selected rows, and signals required to read out the electrical charge. A signal that is output to a column output line 410 is output to a horizontal scanning circuit 203 via a column gain 206 and a column circuit 207, which are connected to the column output lines. The horizontal scanning circuit 203 sequentially outputs signal output corresponding to one row in the horizontal direction.

Figure 3:
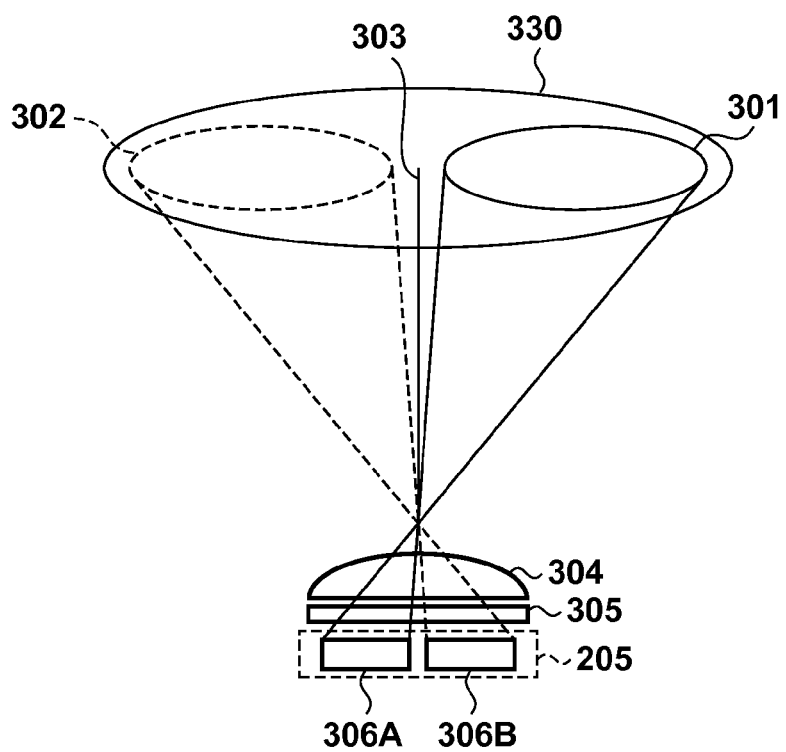
FIG. 3 is a conceptual diagram in which luminous flux from an exit pupil of an image capturing lens is incident on a unit pixel according to the first embodiment of the present invention.

FIG. 3 is a conceptual diagram of luminous flux that has exited from an exit pupil of an imaging lens, and is incident on a unit pixel. A first photodiode (a photoelectric conversion element) 306A and a second photodiode 306B are provided in the unit pixel 205. A color filter 305 and a micro-lens 304 are arranged in front of the unit pixel 205. The imaging lens 310 has an exit pupil 330.

The center of the luminous flux that has exited from the exit pupil 330 is an optical axis 303 with respect to the pixel that has the micro-lens 304. Light that has passed through the exit pupil is incident on the unit pixel 205 with the optical axis 303 as the center. The exit pupil 330 of the imaging lens 310 includes pupil regions 301 and 302, which are portions of the exit pupil. As shown in FIG. 3, the luminous flux that passes through the pupil region 301 is received by the photodiode 306A via the micro-lens 304, and the luminous flux that passes through the pupil region 302 is received by the photodiode 306B via the micro-lens 304. Accordingly, the photodiodes 306A and 306B respectively receive light from different areas of the exit pupil of the photographing lens. Accordingly, by comparing the signals from the photodiodes 306A and 306B, phase difference type detection can be performed.

Here, a signal that is obtained from the photodiode 306A is defined as an A image signal, and a signal that is obtained from the photodiode 306B is defined as a B image signal. A signal in which the A image signal is added to the B image signal is an A+B image signal, and this A+B image signal can be used for a captured image.

Figure 4:
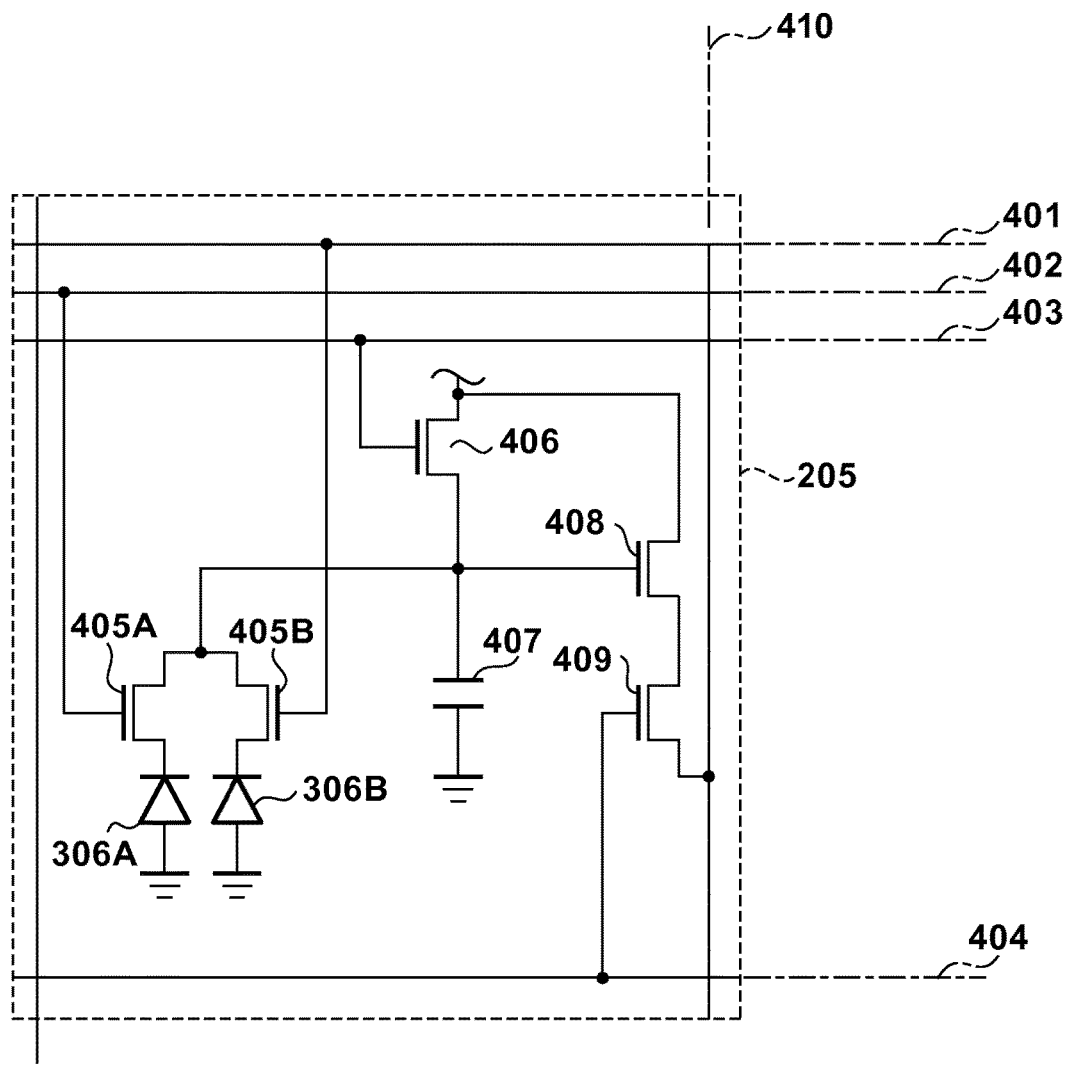
FIG. 4 is an equivalent circuit diagram of the unit pixel according to the first embodiment of the present invention.

FIG. 4 shows an equivalent circuit diagram of the unit pixel 205. The electrical charges that are generated and accumulated in the photodiodes 306A and 306B are transferred to a floating diffusion portion (hereinafter referred to as an FD) 407 by controlling a transfer switch 405A with a transfer control signal 402, and controlling a transfer switch 405B with a transfer control signal 401. A source follower amplifier 408 amplifies a voltage signal that is based on the electrical charge that has been accumulated in the FD 407, and outputs the voltage signal as a pixel signal. By controlling a row selection switch 409 with a row selection control signal 404, the output from the source follower amplifier 408 is connected to a column output line 410.

In the case of resetting the unnecessary electrical charge that has accumulated in the FD 407, a reset switch 406 is controlled by a reset signal 403. Furthermore, in the case of resetting the photodiodes 306A and 306B, a reset is executed by the reset switch 406 along with controlling the transfer switch 405A with the transfer control signal 402, and controlling the transfer switch 405B with the transfer control signal 401. The transfer control signals 401 and 402, the reset control signal 403, and the row selection control signal 404 are supplied to each row of the pixel group 208 by the CPU 50 controlling the vertical scanning circuit 204 via the TG 1800.

The A image signal and the B image signal are needed for a correlation operation for focus detection, but the A image signal and the B image signal may be read out individually. Note that in the present embodiment, an example is described in which the A image signal and the A+B image signal are read out, and the B image signal is generated by an operation of the CPU 50 and the auto-focus operating portion 73 at a later stage. Note that the lens control portion 320 is controlled based on the operation result to perform focusing.

FIGS. 5A to 5C show the operations when the vertical scanning circuit 204 combines the output signals from predetermined pixels in the vertical direction. FIG. 5A shows operations in the case in which no combination is performed. The CPU 50 controls the row selection control signal 404 via the TG 1800 and the vertical scanning circuit 204, a selection switch 409_1 is turned ON, and a signal including a unit pixel 205_1 is sent to a column circuit via the column output line 410. FIGS. 5B and 5C show the state of three combined pixels. In the case of combining in a Bayer array, the color of the color filter changes for each row, and therefore one row is skipped each time pixels are selected for combining.

For example, in FIG. 5B, pixels 205_1, 205_3 and 205_5 are R (red) pixels, and R signals are combined. The CPU 50 controls the row selection control signal 404 via the TG 1800 and the vertical scanning circuit 204, and selection switches 409_1, 409_3, and 409_5 that are respectively connected to the pixels 205_1, 205_3 and 205_5 are simultaneously turned ON and connected to the column output line 410. According to this operation, the output from the three R pixels is combined into a signal, which is transferred to the column circuit 410.

Likewise, in FIG. 5C, pixels 205_4, 205_6 and 205_8 are G (green) pixels, the CPU 50 controls the row selection control signal 404 via the vertical scanning circuit 204, and selection switches 409_4, 409_6 and 409_8 that are respectively connected to the pixels are simultaneously turned ON and connected to the column output line 410. According to this operation, the output from the three G pixels is combined into a signal, which is transferred to a column circuit 410.

As described in the above example, the pixels for combining are selected so that every third row is the center of gravity, that is to say, the combining rows' center of gravity is the third row for the first R, is the sixth row for the next G, is the ninth row for the next R, and is the twelfth row for the next G. In the examples of FIGS. 5A to 5C, pixels are combined when the data is transferred from the column output line 410, but vertical pixel combining may be realized by providing combining switches that connect the FDs 407 of the rows to each other, and connecting the combining switches with necessary portions.

FIGS. 6A and 6B show examples of the A image signal and the A+B image signal each being combined in the vertical direction (column direction). Also referring to FIG. 4, in FIG. 6A, the CPU 50 controls the transfer control signal 402 via the TG 1800 and the vertical scanning circuit 204, the transfer switches 405A for the pixels are turned ON, and the electrical charges that have accumulated in the photodiodes 306A are transferred to the FDs 407. In the state in which the electrical charges of the A image have been transferred to the FDs 407, the CPU 50 controls the row selection control signal 404 via the TG 1800 and the vertical scanning circuit 204, the selection switches 409_1, 409_3 and 409_5 of the three R rows are simultaneously turned ON, and the output from the three pixels is combined into a signal that is transferred to the column circuit 410. Likewise, the selection switches 409_4, 409_6 and 409_8 are simultaneously turned ON, and the output from the three G pixels is combined into a signal that is transferred to the column circuit 410.

In FIG. 6B, the CPU 50 controls the transfer control signal 401 via the TG 1800 and the vertical scanning circuit 204, the transfer switches 405B of the pixels are turned ON, and the accumulated electrical charges of the photodiodes 306B are added to the electrical charges of the A image already inserted to the FDs 407 to obtain the electrical charges of A+B. In the state in which the electrical charges of the A+B image have been transferred to the FDs 407, the CPU 50 controls the row selection control signal 404 via the TG 1800 and the vertical scanning circuit 204, the selection switches 409_1, 409_3 and 409_5 of the three R rows are simultaneously turned ON, and the output from the three pixels is combined into a signal that is transferred to the column circuit 410. Likewise, the selection switches 409_4, 409_6 and 409_8 of the three G rows are simultaneously turned ON, and the output from the three G pixels is combined into a signal that is transferred to the column circuit 410. As described above, row selection is successively performed so as to sequentially read out the vertically combined signals from the A image output and the A+B image output.

Figure 7:
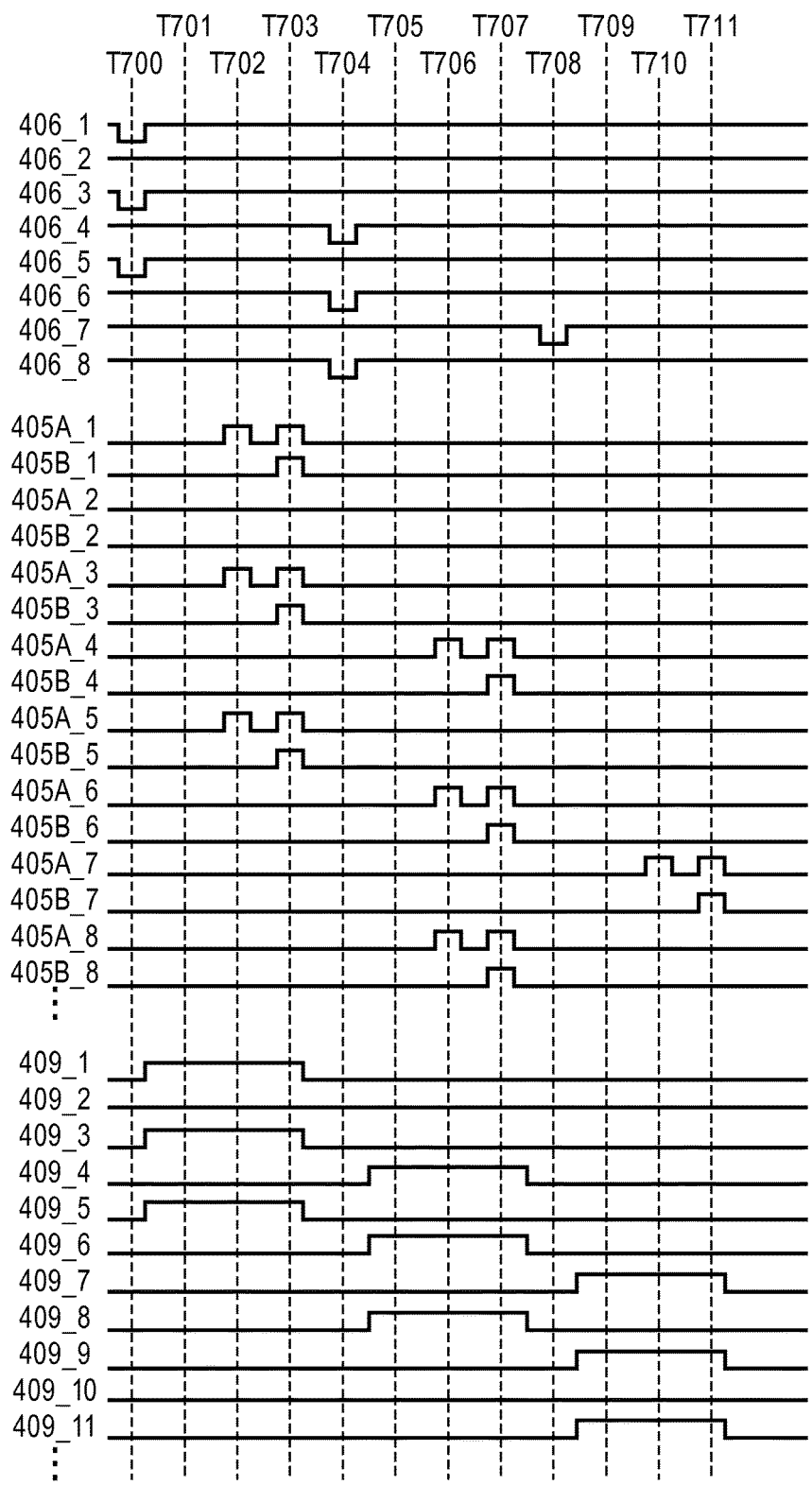
FIG. 7 is a timing chart of operations according to the first embodiment of the present invention.

FIG. 7 is a timing chart of the operations according to the first embodiment. FIG. 7 shows the timing at which the CPU 50 supplies control signals via the TG 1800 and the vertical scanning circuit 204 to the reset switches 406, the transfer switches 405A and 405B, and the row selection switches 409 of each row of unit pixels 205 of the image sensor 1400.

First, at a timing T700, the reset switches 406_1, 406_3, and 406_5 are turned ON, and the FDs 407 on each row are reset. Note that a type is described in which the switches are turned ON by a LOW reset signal, but may instead be turned ON by a HIGH reset signal.

At a timing T701, the row selection switches 409_1, 409_3, and 409_5 are simultaneously turned ON, and the reset signals resulting from resetting of the FDs 407 are read out. At a timing T702, the transfer switches 405A_1, 405A_3, and 405A_5 are simultaneously turned ON, and the electrical charges of the A image are sent to the FDs 407. The row selection switches 409_1, 409_3 and 409_5 are left ON, and therefore a signal in which the A image output from the three pixels is combined is read out to the column circuit. Then correlative double-sampling (hereinafter referred to as CDS) is performed by subtracting the reset signal from the read out A image signal, and the result is output from the image sensor 1400.

At a timing T703, the transfer switches 405A_1, 405A_3, 405A_5, 405B_1, 405B_3 and 405B_5 are simultaneously turned ON, and by transferring the electrical charges of the B image to the FDs 407 on the first, third and fifth rows, the electrical charges of an A+B image are obtained. The row selection switches 409_1, 409_3 and 409_5 are left ON, and therefore a signal in which the A+B image output from the three pixels has been combined is read out to the column circuit. Then CDS is performed by subtracting the reset signal from the read out A+B image signal, and the result is output from the image sensor 1400. After the output, the row selection switches 409_1, 409_3 and 409_5 are turned OFF.

At a timing T704, the reset switches 406_4, 406_6 and 406_8 are turned ON, and the FDs 407 on the rows are reset. At a timing T705, the row selection switches 409_4, 409_6 and 409_8 are simultaneously turned ON, and the reset signals resulting from resetting of the FDs 407 are read out.

At a timing T706, the transfer switches 405A_4, 405A_6 and 405A_8 are simultaneously turned ON, and the electrical charges of the A image are transferred to the FDs 407. The row selection switches 409_4, 409_6 and 409_8 are left ON, and therefore a signal in which the A image output from the three pixels has been combined is read out to the column circuit. CDS is performed by subtracting the reset signal from the read out A image signal, and the result is output from the image sensor 1400.

At a timing T707, the transfer switches 405A_4, 405A_6, 405A_8, 405B_4, 405B_6 and 405B_8 are simultaneously turned ON, and by transferring the electrical charges of the B image to the FDs 407 on the fourth, sixth and eighth rows, the electrical charges of an A+B image are obtained. The row selection switches 409_4, 409_6 and 409_8 are left ON, and therefore a signal in which the A+B image output from the three pixels has been combined is read out to the column circuit. Then CDS is performed by subtracting the reset signal from the read out A+B image signal, and the result is output from the image sensor 1400. After the output, the row selection switches 409_4, 409_6 and 409_8 are turned OFF.

A portion of the diagram has been omitted, but at a timing T708, the reset switches 406_7, 406_9 and 406_11 are turned ON, and the FDs 407 on the rows are reset. At a timing T709, the row selection switches 409_7, 409_9 and 409_11 are simultaneously turned ON, and the reset signals resulting from resetting of the FDs 407 are read out.

A portion of the diagram has been omitted, but at a timing T710, the transfer switches 405A_7, 405A_9 and 405A_11 are simultaneously turned ON, and the electrical charges of the A image are transferred to the FDs 407. The row selection switches 409_7, 409_9 and 409_11 are left ON, and therefore a signal in which the A image output from the three pixels has been combined is read out to the column circuit. CDS is performed by subtracting the reset signal from the read out A image signal, and the result is output from the image sensor 1400.

At a timing T711, the transfer switches 405A_7, 405A_9 and 405A_11, 405B_7, 405B_9 and 405B_11 are simultaneously turned ON, and by transferring the electrical charges of the B image to the FDs 407 on the seventh, ninth and eleventh rows, the electrical charges of the A+B image are obtained. The row selection switches 409_7, 409_9 and 409_11 are left ON, and therefore a signal in which the A+B image output from the three pixels has been combined is read out to the column circuit. CDS is performed by subtracting the reset signal from the read out A+B image signal, and the result output from the image sensor 1400.

For the A image signal, this process is repeated a number of times that corresponds to ⅓ of the number of rows, and for the A+B image signal, this process is repeated for a number of times that corresponds to ⅓ of the number of rows.

If the output for the A image and A+B image are combined with respect to the vertical direction as in the first embodiment, the correlation operation for focus detection also obtains an image signal that is combined with respect to the vertical direction, and therefore an operation can be performed with low-noise output. For this reason, an increase in focus detection accuracy is expected.

Second Embodiment

A second embodiment describes an example in which the selection of whether or not to combine pixels in the vertical direction (the column direction) during the live view (hereinafter referred to as LV) operation is made according to the subject.

Figure 8A:
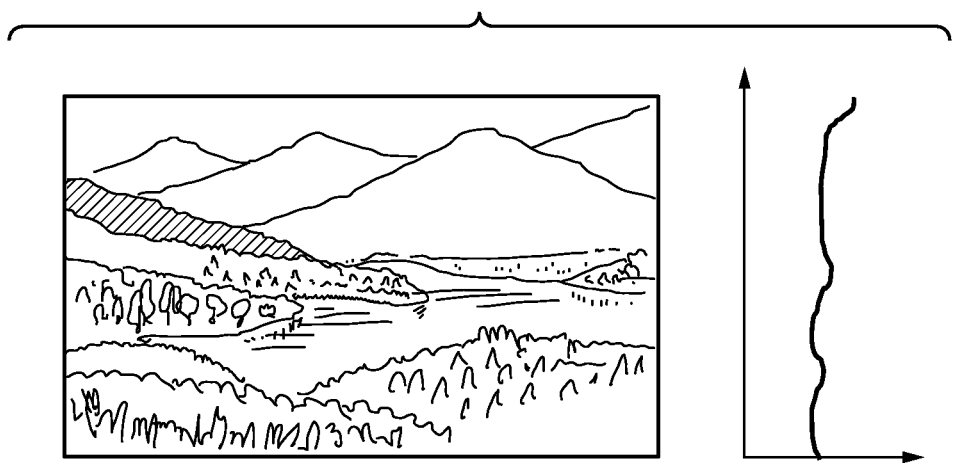
FIGS. 8A and 8B are diagrams that show an example of a subject according to a second embodiment of the present invention.
Figure 8B:
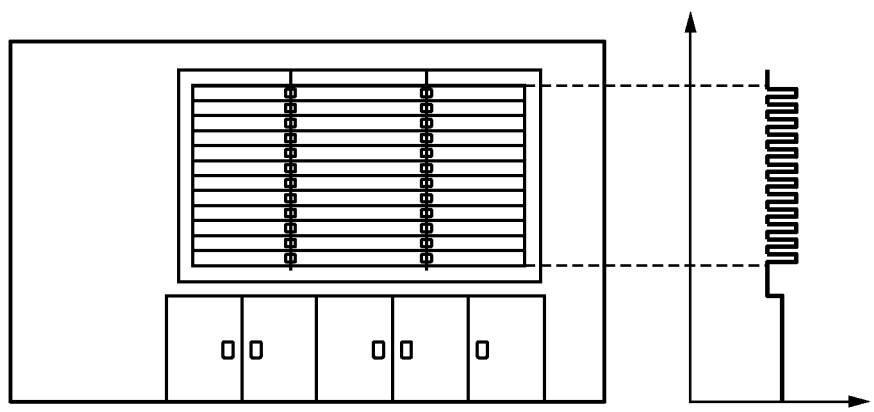

FIGS. 8A and 8B show examples of a subject and a vertical mapping in which the level has been averaged in the column direction. Natural scenery is photographed in FIG. 8A, and the vertical mapping changes gently. The inside of a building is photographed as the subject in FIG. 8B. The blinds of the window have very fine lines, there are portions that have and do not have incoming sunlight, and it is understood that the mapping in these portions undergoes large changes in a narrow space. With a subject that has a high spatial frequency such as in FIG. 8B, if the vertical pixel combining shown in the first embodiment is performed, the large change in the above narrow space cannot be appropriately obtained as a signal, and there is a possibility that correct focus detection cannot be performed. For this reason, the CPU 50 analyses the spatial frequency of the image, and switches the setting for vertical pixel combining read out driving based on the analysis results. Note that the analysis of the spatial frequency is performed using discrete cosine transform (DCT) or the like.

FIG. 9 shows a flowchart of control for switching between whether or not to execute vertical pixel combining read out driving according to the subject. After image capture surface AF readout has begun during LV operation, first, reading out is performed with vertical non-combining (step S900). After that, the spatial frequency of the subject is detected by a subject analysis portion 74 (step S901). In the case where the spatial frequency of the subject is greater than or equal to the predetermined amount (step S902: Yes), LV operations are continued, and if the spatial frequency of the subject is less than the predetermined amount (step S902: No), then there is a switch to vertical pixel combining (step S903) and LV operation is continued. Note that the definition of "predetermined" here is based on the number of vertically combined pixels.

Also, the setting of the vertical pixel combining read out driving may be changed according to the luminance of the subject. For example, a configuration is possible in which in the case of under exposure despite opening the diaphragm 312 or increasing the ISO sensitivity, there is always a switch to the vertical pixel combining read out driving when performing the LV operation.

In the second embodiment, accurate focus detection can be performed by performing switch control of the vertical pixel combining read out driving according to the spatial frequency of the subject.

Third Embodiment

A third embodiment shows an example of always switching to the vertical pixel combining read out driving when a video recording request is made. FIG. 10 shows a flowchart of the third embodiment. If the CPU 50 makes a request for video recording while the LV operation is being performed, whether or not the LV operation is the vertical non-combining read out driving is checked (step S1000), and in the case of it being the vertical non-combining, a switch to the vertical pixel combining is made (step S1001). Thereafter, video shooting begins.

In the third embodiment, when performing video recording, the vertical pixel combining read out driving is always performed in order to prioritize the recorded image quality. In doing so, appropriate driving can be executed in response to the objective.

Fourth Embodiment

A fourth embodiment shows an example in which whether or not to read out the focus detection signal with the vertical pixel combining read out driving is switched according to the shooting mode.

Figure 11A:
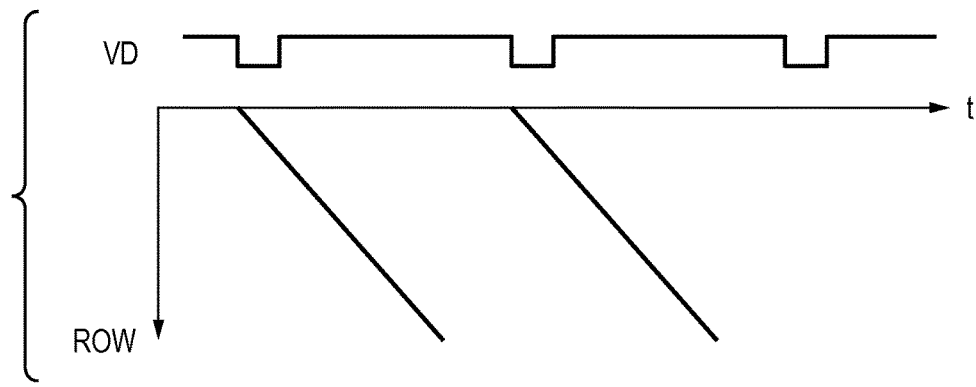
FIGS. 11A to 11C are illustrative diagrams of a read out rate according to the presence or absence of a read out for focus detection output according to a fourth embodiment of the present invention.
Figure 11B:
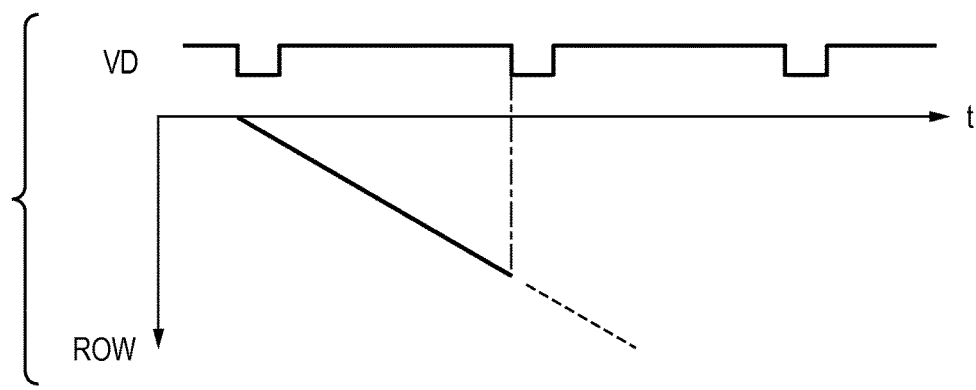
Figure 11C:
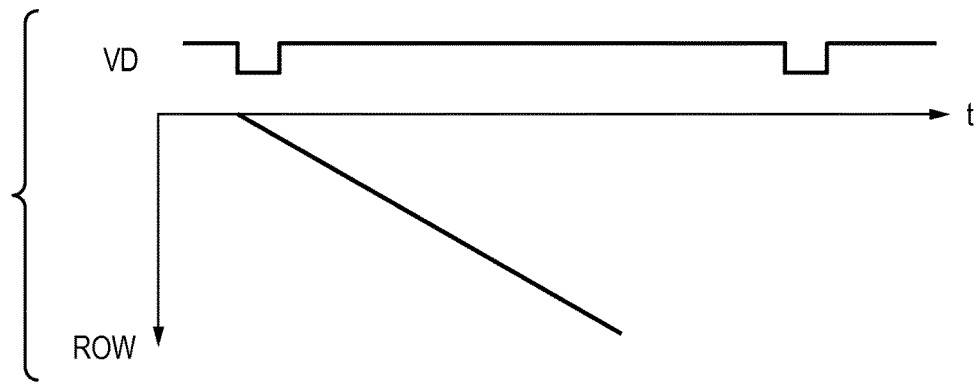

FIGS. 11A to 11C are figures that show a reference signal (hereinafter referred to as VD) that is output every frame, and the read out time. FIG. 11A shows a read out operation when focus detection is not being performed. The vertical axis indicates the image sensor 1400 row, and the horizontal axis indicates time. A slanted solid line shows the read out timing of the rows. In the example of FIG. 11A, read out has ended within one VD period.

FIG. 11B shows the read out operation when the focus detection signal is read out with the vertical pixel combining. As also described in the first embodiment, there is a need to output the A image and the A+B image, and therefore the read out time is long. In this example, the reading out of all of the rows within one VD period cannot be completed, and appropriate output cannot be performed.

FIG. 11C shows a state in which the VD interval is expanded so as to allow appropriate output when reading out focus detection signals with vertical pixel combining. As shown in FIG. 11C, the VD interval is expanded in the case in which the signal for focus detection is read.

FIG. 12 shows a flowchart of the fourth embodiment. The LV operation is started, the LV mode is examined to see if it is not a high speed rate (step S1200), and in the case of it not being a high speed rate, the focus detection signal is read out by vertical pixel combining read out driving in addition to the actual image (step S1203). In the case where the LV mode is a high speed rate, next, whether the resolution is high resolution is checked (step S1201), and if the resolution is not high resolution, then likewise the focus detection signal is read out by vertical pixel combining read out driving in addition to the actual image (step S1203). In the case where the resolution is high resolution, only the actual image is read out (step S1202).

In the fourth embodiment, there is also a mode in which the read out rate cannot be reduced, and therefore it is possible to select a mode in which the image can be output without a drop in rate by switching (determining) whether or not to read out the signal for focus detection according to the mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-163942, filed Aug. 11, 2014, which is hereby incorporated by reference herein in its entirety.

What is claimed is:

1. An image capturing apparatus comprising:
an image sensor that includes a pixel array in which a plurality of unit pixels, each having a plurality of photoelectric conversion elements, are arranged in matrix, and a plurality of column output lines respectively provided in columns of the pixel array; and
a controller that performs control such that in a case in which signals from a portion of the plurality of photoelectric conversion elements of each of the plurality of unit pixels is to be read out, signals from a plurality of unit pixels that are arranged in the same column of the pixel array are output simultaneously to one column output line out of the plurality of column output lines; and
an analyzer that analyses a spatial frequency of a subject, wherein the controller determines whether or not signals from the plurality of unit pixels are to be output to one column output line out of the plurality of column output lines at the same time, based on as analysis result from the analyzer.

2. An image capturing apparatus comprising:

an image sensor that includes a pixel array in which a plurality of unit pixels, each having a plurality of photoelectric conversion elements, are arranged in matrix, and a plurality of column output lines respectively provided in columns of the pixel array;

a controller that performs control such that in a case in which signals from a portion of the plurality of photoelectric conversion elements of each of the plurality of unit pixels is to be read out, signals from a plurality of unit pixels that are arranged in the same column of the pixel array are output simultaneously to one column output line out of the plurality of column output lines; and a detector that detects a luminance of a subject, wherein the controller determines whether or not signals from the plurality of unit pixels are to be output to one column output line out of the plurality of column output lines at the same time, based on a detection result from the detector.

3. An image capturing apparatus comprising:

an image sensor that includes a pixel array in which a plurality of unit pixels, each having a plurality of photoelectric conversion elements, are arranged in matrix, and a plurality of column output lines respectively provided in columns of the pixel array;

a controller that performs control such that in a case in which signals from a portion of the plurality of photoelectric conversion elements of each of the plurality of unit pixels is to be read out, signals from a plurality of unit pixels that are arranged in the same column of the pixel array are output simultaneously to one column output line out of the plurality of column ouput lines; and a selector that selects a shooting mode, wherein the controller determines whether or not signals from the plurality of unit pixels are to be output to one column output line out of the plurality of column output lines at the same time, based on a selection result from the selector, and wherein in a case of a mode in which the image capturing apparatus records a video, the controller determines whether or not signals from the plurality of unit pixels are to be output to one column output line out of the plurality of column output lines at the same time, based on whether or not high resolution images are to be recorded.

4. A method of controlling an image capturing apparatus that has an image sensor that includes a pixel array in which a plurality of unit pixels, each having a plurality of photoelectric conversion elements, are arranged in matrix, and a plurality of column output lines respectively provided in columns of the pixel array, the method comprising:

performing control such that, in a case in which signals from a portion of the plurality of photoelectric conversion elements of each of the plurality of unit pixels is to be read out, signals from a plurality of unit pixels that are arranged in the same column of the pixel array are output simultaneously to one column output line out of the plurality of column output lines; and analyzing a spatial frequency of a subject, wherein in the performing control, whether or not signals from the plurality of unit pixels are to be output to one column output line out of the plurality of column output lines at the same time is determined, based on an analysis result from the analyzer.

5. A method of controlling an image capturing apparatus that has an image sensor that includes a pixel array in which a plurality of unit pixels, each having a plurality of photoelectric conversion elements, are arranged in matrix, and a plurality of column output lines respectively provided in columns of the pixel array, the method comprising:

performing control such that, in a case in which signals from a portion of the plurality of photoelectric conversion elements of each of the plurality of unit pixels is to be read out, signals from a plurality of unit pixels that are arranged in the same column of the pixel array are output simultaneously to one column output line out of the plurality of column output lines; and detecting a luminance of a subject, wherein in the performing control, whether or not signals from the plurality of unit pixels are to be output to one column output line out of the plurality of column output lines at the same time is determined, based on a detection result from the detecting.

6. A method of controlling an image capturing apparatus that has an image sensor that includes a pixel array in which a plurality of unit pixels, each having a plurality of photoelectric conversion elements, are arranged in matrix, and a plurality of column output lines respectively provided in columns of the pixel array, the method comprising:

performing control such that, in a case in which signals from a portion of the plurality of photoelectric conversion elements of each of the plurality of unit pixels is to be read out, signals from a plurality of unit pixels that are arranged in the same column of the pixel array are output simultaneously to one column output line out of the plurality of column output lines; and selecting a shooting mode, wherein in the performing control, whether or not signals from the plurality of unit pixels are to be output to one column output line out of the plurality of column output lines at the same time is determined, based on a selection result from the selecting, and wherein in a case of a mode its which the image capturing apparatus records a video, whether or not signals from the plurality of unit pixels are to be output to one column output line out of the plurality of column output lines at the same time is determined, based on whether or not high resolution images are to be recorded.

* * * * *